United States Patent [19]
Grass

[11] 3,950,991
[45] Apr. 20, 1976

[54] APPARATUS FOR MEASURING AN ABSOLUTE TEMPERATURE OR A TEMPERATURE DIFFERENTIAL WITH REGENERATIVE SWITCHING SENSORS

[75] Inventor: Ben Grass, Dollard des Ormeaux, Canada

[73] Assignee: Multi-State Devices Ltd., Dorval, Canada

[22] Filed: June 9, 1975

[21] Appl. No.: 585,443

[52] U.S. Cl. .............................. 73/342; 73/362 SC; 307/310; 323/69; 323/75 F; 323/75 H
[51] Int. Cl.² .......................................... G01K 7/00
[58] Field of Search ........... 73/362 R, 362 SC, 342; 307/310; 323/75 F, 75 H, 69

[56] References Cited
UNITED STATES PATENTS

| | | | |
|---|---|---|---|
| 3,068,698 | 12/1962 | Roberts et al. | 73/342 |
| 3,364,671 | 10/1967 | Gordy et al. | 73/362 AR |
| 3,420,104 | 1/1969 | Troemel et al. | 73/362 SC |
| 3,440,883 | 4/1969 | Lightner | 73/362 SC |
| 3,604,957 | 9/1971 | Satula | 307/310 |
| 3,672,218 | 6/1972 | Hartman | 73/362 R |

*Primary Examiner*—S. Clement Swisher
*Assistant Examiner*—Frederick Shoon
*Attorney, Agent, or Firm*—Spencer & Kaye

[57] ABSTRACT

An apparatus for measuring an absolute temperature or a temperature differential. The apparatus uses two temperature sensitive switching devices exhibiting regenerative switching action at a power level which is dependent on the temperature sensed by such switching devices. Means are provided for simultaneously applying an increasing voltage to such switching devices to make them switch, and a detector is connected to both switching devices for measuring the time interval between switching of the first and second switching devices and for providing an output which is proportional to the absolute temperature sensed by the switching devices or to the temperature differential sensed by the switching devices. A display device is connected to the detector for providing a visual indication of the absolute temperature sensed or of the temperature differential sensed.

7 Claims, 5 Drawing Figures

APPARATUS FOR MEASURING AN ABSOLUTE TEMPERATURE OR A TEMPERATURE DIFFERENTIAL WITH REGENERATIVE SWITCHING SENSORS

This invention relates to an apparatus for measuring an absolute temperature or a temperature differential.

Various apparatus are used for measuring absolute temperatures or temperature differentials depending on the application. Some of the most commonly known are thermometers, bimetallic switches, thermocouples and temperature sensitive resistors. However, thermometers are large, delicate devices and do not lend themselves to be incorporated into electronic systems. Bimetallic switches are essentially on-off devices that switch at a preset temperature. Thermocouples are an accurate way of measuring temperature but these devices need a reference junction and their output needs considerable amplification before it is useful. Temperature sensitive resistors, such as thermistors, posistors, etc., are good but not very sensitive, that is to say that their output varies slowly with temperature; on top of that they are not linear; therefore, they need considerable amplification and linearization.

It is therefore the object of the present invention to provide an apparatus for measuring temperature which substantially overcomes the drawbacks of the above prior art devices.

The apparatus, in accordance with the invention, comprises a first and a second switching devices exhibiting regenerative switching action at a power level which is dependent on the temperature sensed by such switching devices, means for simultaneously applying an increasing voltage to the first and second switching devices to make them switch, a detector connected to the first and second switching devices for measuring the time interval between switching of the first and the second switching devices and for providing an output which is proportional to the absolute temperature or the temperature differential sensed by such switching devices, and a display device connected to the detector for providing a visual indication of the output of such detector.

In one embodiment of the invention, each switching device is connected in series with a resistor of predetermined impedance and the amplitude of the voltage source and the value of each resistor are selected to ensure regenerative switching at the maximum and the minimum value of temperature to be sensed. Such source of increasing voltage may be a conventional A.C. power line.

The detector may be a differentiating type detector producing output pulses at a time interval which is proportional to the absolute temperature or the temperature differential sensed by the switching devices. The detector may also be a different amplifier type detector providing an output pulse having a width which is proportional to the absolute temperature or the temperature differential sensed by the switching devices.

When the apparatus is used for sensing absolute temperature, switching devices having different characteristics are used. However, to measure temperature differentials, switching devices having substantially the same electrical characteristics are used.

The invention will now be disclosed, by way of examples, with reference to preferred embodiments illustrated in the accompanying drawings in which.

Figure 1:
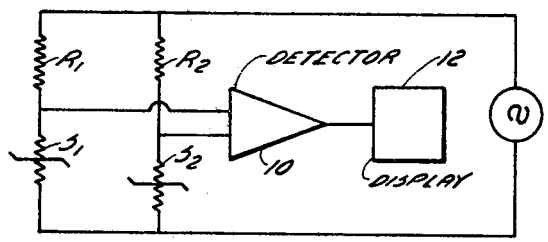
FIG. 1 illustrates a block diagram of an apparatus in accordance with the invention.

Referring to FIG. 1, there is shown a block diagram of an absolute temperature or temperature differential measuring apparatus in accordance with the invention. The apparatus comprises a first temperature sensitive switching device $S_1$ in series with a resistor $R_1$ across a source of alternating voltage such as a conventional 110 volts A.C. power line, a second temperature sensitive switching device $S_2$ connected in series with a resistor $R_2$ across the same source, a detector 10 having a first input connected to the connecting point of switching device $S_1$ with resistor $R_1$ and a second input connected to the connecting point of switching device $S_2$ with resistor $R_2$, and a display device 12 connected to the output of detector 10.

Figure 2:
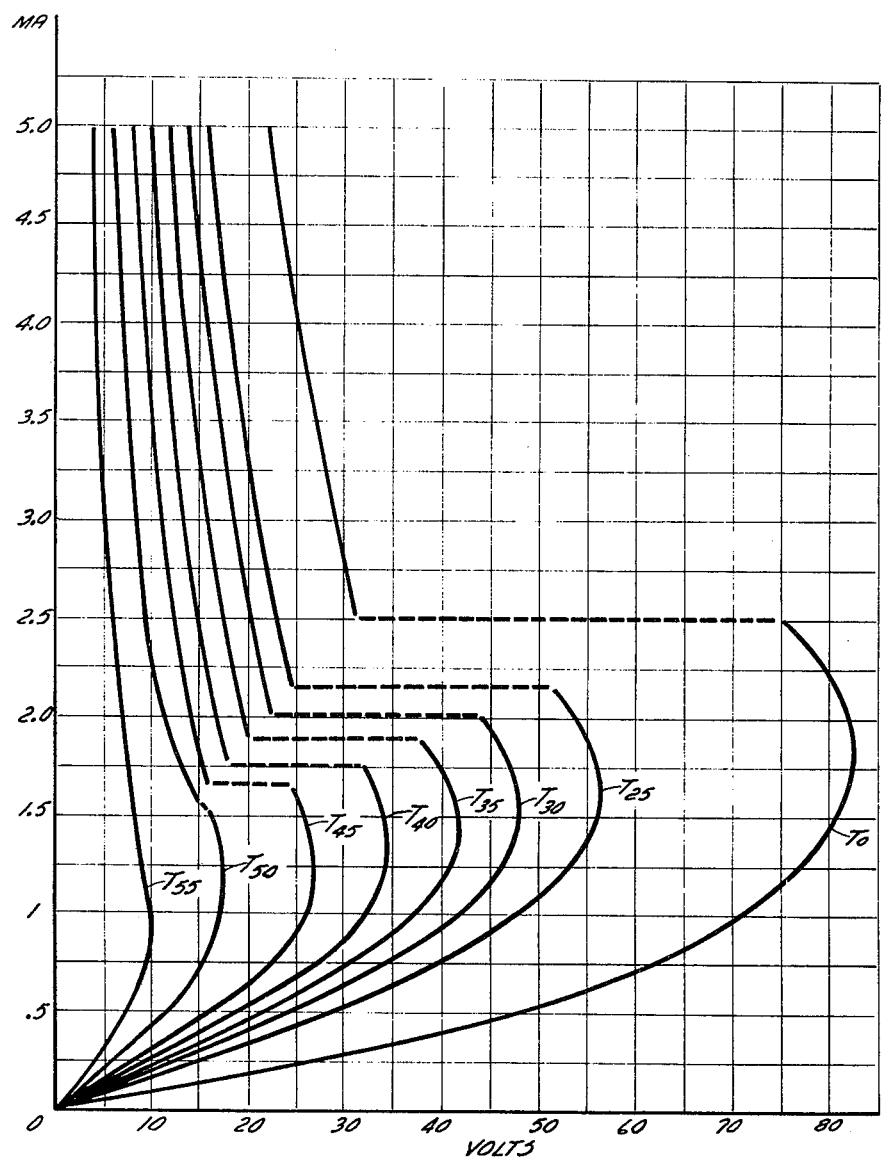
FIG. 2 illustrates the temperature dependent current-voltage characteristics of a vanadium dioxide switching device which is well suited for the present invention.

The temperature sensitive switching devices which are suitable for the present invention are those which exhibit regenerative switching at a power level which is dependent on the temperature sensed by the switching devices. FIG. 2 of the drawings shows the temperature dependent current-voltage characteristics of a vanadium dioxide switching device which is well suited for the present invention. As it will be noted the current-voltage curves of such a device vary for each temperature sensed by the device and each curve $T_0$, $T_{25}$, $T_{30}$, etc. corresponds to a temperature of 0°, 25°, 30°C, etc. It will be seen that, as the temperature increases, the switching devices switch at a lower voltage. Of course, the invention is not limited to the use of vanadium dioxide switching devices and various other devices or circuits exhibiting similar characteristics may be used. Some of the known devices are the amorphous glass devices, transition metal oxide devices and certain classes of negative temperature switching devices. The expression "temperature dependent regenerative switching devices" as used in the present application means devices exhibiting avalanche behaviour due to their very high negative temperature coefficient resistance. As commonly known, most thermal avalanche behaviour is due to a current crowding effect in which current crowding leads to local heating in the device which in turn leads to further current crowding. On completion of this process, most of the device current flows through a very narrow filament in the device. Because of the relatively low resistance of the conducting material, total device resistance becomes quite low. Such devices therefore behave like switches and go from high resistance to a low resistance state in a very short period of time. The basic switching mechanism of the temperature dependent regenerative switching device is usualy thermal and occurs in response to both heating and the ambient thermal energy. In most cases, switching action is observed when the sum of all energies yields a given temperature at the switching device.

In other words, whatever the source of heat, the switching device always switches at an essentially fixed temperature.

Figure 3:
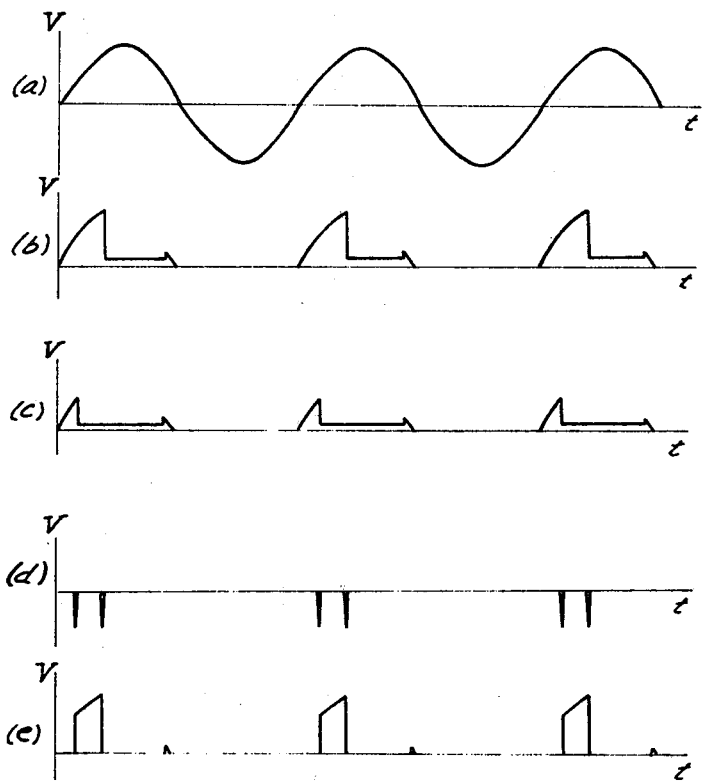
FIG. 3 illustrates waveforms appearing across the elements of the apparatus illustrated in FIG. 1 in relation to the power supply voltage.

The value of the power supply voltage and the value of the resistors $R_1$ and $R_2$ are chosen so that once during each period of the alternating power supply source, each switching device switches to its low voltage high current state as illustrated in FIGS. 3a, 3b and 3c of the drawings. This will cause a sharp drop in the voltage across each switching device $S_1$ or $S_2$ and this voltage drop is sensed by detector 10. The detector 10 will sense the time interval between switching of the first and second switching devices $S_1$ and $S_2$ and will provide an output which is proportional to the absolute temperature or to the temperature differential sensed by the two switching devices. This output will be shown on display device 12.

Although the power supply voltage is shown as being a conventional A.C. power line, it is to be understood that other sources of periodically increasing voltage may be used provided that such sources are of constant frequency.

Figure 4:
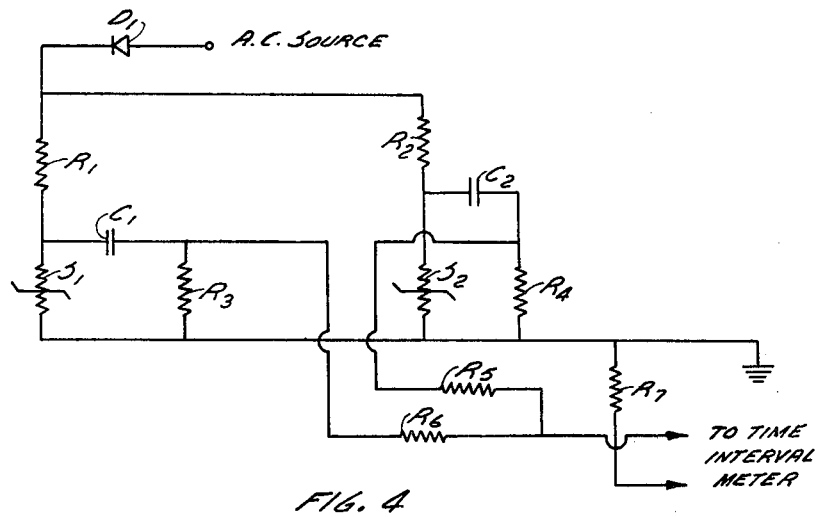
FIG. 4 illustrates an apparatus in accordance with the invention using a differentiating type detector.

The detection of the time inteval between switching of devices $S_1$ and $S_2$ may be done by means of a differentiating type detector as illustrated in FIG. 4 of the drawings. The elements $R_1$, $R_2$, $S_1$ and $S_2$ are identical to the ones shown in FIG. 1 and are not further disclosed. The A.C. voltage is applied to the above elements through a diode $D_1$ so as to feed half waves to the measuring apparatus. It is to be understood, however, that full waves could be applied to the measuring apparatus but this would complicate the circuitry without improving the accuracy thereof. The voltage drop across switching device $S_1$ is differentiated by capacitor $C_1$ and resistor $R_3$. Simularly, the voltage drop appearing across switching device $S_2$ is differentiated by capacitor $C_2$ and resistor $R_4$. An output pulse will thus appear across resistors $R_3$ and $R_4$ each time that the switching devices $S_1$ and $S_2$ snap as illustrated in FIG. 3d of the drawings. These pulses are transmitted through a combining network including resistors $R_5$, $R_6$ and $R_7$ to a suitable display device such as a time interval meter.

Figure 5:
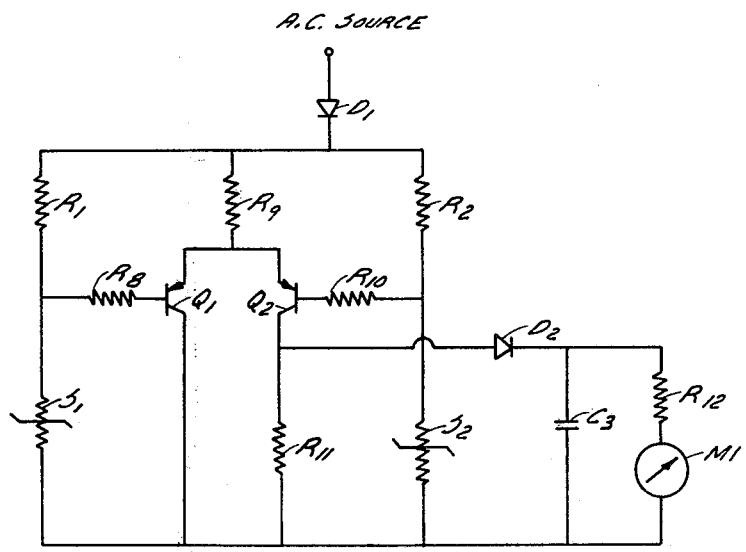
FIG. 5 illustrates an apparatus in accordance with the invention using a differential amplifier type detector.

The detection of the time interval between switching of devices $S_1$ and $S_2$ may also be done by means of a differential amplifier type detector as illustrated in FIG. 5. The elements $R_1$, $R_2$, $S_1$ and $S_2$ correspond to the elements identified by the same reference characters in FIG. 1 and diode $D_1$ corresponds to the same element shown in FIG. 4 and, consequently, these elements are not further disclosed. The differential amplifier consists of transistors $Q_1$ and $Q_2$ and resistors $R_8$, $R_9$, $R_{10}$ and $R_{11}$. Resistor $R_8$ is connected between the base of transistor $Q_1$ and the connecting point of resistor $R_1$ with switching device $S_1$, whereas resistor $R_{10}$ is connected between the base of transistor $Q_2$ and the connecting point of resistor $R_2$ with switching device $S_2$. Resistor $R_9$ is located in the emitter circuit of transistors $Q_1$ and $Q_2$ and is connected to the A.C. source through diode $D_1$. Output resistor $R_{11}$ is connected in the collector circuit of transistor $Q_2$. The above differential amplifier operates in a conventional way. Before either switching device $S_1$ or $S_2$ has snapped and after both switching devices have snapped the voltage appearing across each switching device is substantially the same and the output of the differential amplifier is null. If however only one switching device has snapped then the voltage across the switching devices will be appreciably different. The output of the differential amplifier detector will thus be a pulse the width of which is proportional to the temperature differential sensed by the switching devices as illustrated in FIG. 3e of the drawings. This output pulse can be fed to a suitable display device such as an analogue reader as illustrated in FIG. 5 and consisting of a diode $D_2$ and a capacitor $C_3$ which stores the average value of the voltage appearing across resistor $R_{11}$. A meter $M_1$ connected in series with a resistor $R_{12}$ is used to provide a visual indication of the voltage stored in capacitor $C_3$. The reading on the meter $M_1$ is thus proportional to the absolute temperature or temperature differential sensed by switching devices $S_1$ and $S_2$.

To measure a temperature differential, two temperature sensitive switching devices of similar electrical characteristics are used. However, if it is desired to measure absolute temperature, then two temperature sensitive switching devices of dissimilar characteristics must be used. The reason for this is that, if both temperature switching devices $S_1$ and $S_2$ are similar, then, if they both experience the same amount of temperature increase, the time interval between switching will remain constant.

The above disclosed apparatus is inherently simple and very stable and is particularly suitable for infra-red detection, inexpensive temperature measurement and control, flow meters and level detectors.

Although the invention has been disclosed with reference to preferred embodiments of the invention it is to be understood that various modifications may be made to such apparatus within the scope of the claims and the spirit of the invention. For example, the detector and the display devices may take other forms than the one illustrated in FIGS. 4 and 5 of the drawings. Any detector device capable of measuring the time interval between switching of temperature sensitive switching devices $S_1$ and $S_2$ may be used. Similarly, any type of display device capable of providing a visual indication of the absolute or differential temperature measured by the detector device may be used. It is also to be understood that the voltage applied across switching devices $S_1$ and $S_2$ need not necessarily be a sinusoidal voltage and may be any increasing voltage such as a ramp.

What is claimed is:

1. A temperature measuring apparatus comprising:
   a. a first and a second temperature sensitive switching devices exhibiting regenerative switching action at a power level which is dependent on the temperature sensed by said switching devices;
   b. means for simultaneously applying an increasing voltage to said first and second switching devices to make them switch;
   c. a detector connected to said first and second switching devices for measuring the time interval between switching of the first and second switching devices and for providing an output which is proportional to the absolute temperature or the temperature differential sensed by said switching devices; and
   d. a display device for providing a visual indication of the output of said detector.

2. An apparatus as defined in claim 1, wherein each switching device is connected in series with a resistor of predetermined impedance, the amplitude of said source and the value of said resistors been selected so as to ensure regenerative switching at the maximum and minimum value of the temperature to be sensed.

3. An apparatus as defined in claim 1, wherein said source of increasing voltage is a conventional A.C. power line.

4. An apparatus as defined in claim 1, wherein said detector is a differentiating type detector producing output pulses at a time interval which is proportional to the absolute temperature or the temperature differential sensed by the switching devices.

5. An apparatus as defined in claim 1, wherein said detector is a differential amplifier type detector providing an output pulse having a width which is proportional to the absolute temperature or the temperature differential sensed by the switching devices.

6. An apparatus as defined in claim 1, wherein said switching devices have substantially the same electrical characteristics and are used to measure temperature differentials.

7. An apparatus as defined in claim 1, wherein said switching devices have different electrical characteristics and are used to measure absolute temperatures.

* * * * *